United States Patent [19]

Memon et al.

[11] Patent Number: 5,166,239

[45] Date of Patent: Nov. 24, 1992

[54] POLYMERIC ADDITIVES

[75] Inventors: Nazir A. Memon, Yardley; Joseph C. Koziar, Bensalem, both of Pa.

[73] Assignee: Rohm and Haas Company, Philadelphia, Pa.

[21] Appl. No.: 589,119

[22] Filed: Sep. 27, 1990

Related U.S. Application Data

[63] Continuation-in-part of Ser. No. 431,816, Nov. 3, 1989, abandoned.

[51] Int. Cl.$^5$ .............................................. C08K 5/527
[52] U.S. Cl. .................................. 524/120; 524/151; 524/153; 524/287; 524/342
[58] Field of Search ............... 524/120, 151, 153, 287, 524/342

[56] References Cited

U.S. PATENT DOCUMENTS

| | | | |
|---|---|---|---|
| 3,409,587 | 11/1968 | Mills | 524/342 |
| 3,721,704 | 3/1973 | Dexter | 529/287 |
| 4,238,575 | 12/1980 | Kleiner et al. | 529/342 |

FOREIGN PATENT DOCUMENTS

| | | |
|---|---|---|
| 1218778 | 3/1987 | Canada. |
| 114288 | 8/1984 | European Pat. Off. |
| 264931 | 2/1989 | Fed. Rep. of Germany. |
| 62-288655 | 12/1987 | Japan. |
| 63-83157 | 4/1988 | Japan. |

*Primary Examiner*—Kriellion S. Morgan
*Attorney, Agent, or Firm*—Richard A. Haggard; Terence P. Strobaugh

[57] ABSTRACT

The invention is directed to stabilizer compositions, to polymers containing these stabilizer compositions for use as additives in polymeric matrices, and to polymeric products which contain these additives. The stabilizer compositions comprise a ternary composition of a sterically hindered phenol, a less sterically hindered phenol, and an organic phosphite. These compositions are admixed with polymers to provide polymeric additives to improve the physical and mechanical properties of polymeric matrices.

20 Claims, No Drawings

POLYMERIC ADDITIVES

This is a continuation-in-part of application Ser. No. 431,816 filed Nov. 3, 1989 now abandoned.

FIELD OF THE INVENTION

This invention relates to compositions for stabilizing polymers and to products which include these stabilized polymers. The invention particularly relates to compositions for stabilizing butadiene copolymers, acrylic and methacrylic copolymers, and to polymeric products which include these stabilized copolymers.

BACKGROUND OF THE INVENTION

Polymers such as those prepared from methacrylate-butadiene-styrene ("MBS") monomers and polymers predominantly prepared from acrylic and methacrylic, referred to hereinafter as "(meth)acrylic," ester monomers are routinely employed as additives in polymeric matrices to provide products with improved impact properties. MBS polymers, however, are prone to thermal and oxidative degradation at elevated temperatures. (Meth)acrylic polymers used as impact modifiers for polymeric matrices, hereinafter termed acrylic impact modifiers ("AIMS") polymers, also are prone to thermal and oxidative degradation, although to a lesser degree than MBS polymers. This tendency of MBS and AIMS polymers to degrade at elevated temperatures inhibits the ability of these polymers to impart improved impact strength in polymer matrices such as polycarbonates and other engineering resins, as well as their blends which require relatively high processing temperatures.

MBS polymers that are employed as additives in polymeric matrices are routinely treated with stabilizers to protect them against thermal and oxidative degradation. Stabilizers, however, may cause the polymers to lose impact strength and develop colored impurities in the polymer matrix as a byproduct of their antioxidant action.

A need therefore exists for improved stabilizers for polymers such as MBS and AIMS and for improved polymeric products that employ the polymers which incorporate these improved stabilizers.

SUMMARY OF THE INVENTION

The invention is directed to stabilizer compositions, to polymers containing these stabilizer compositions for use as additives in polymeric matrices, and to polymeric products which contain these additives. These compositions are admixed with polymers to provide polymeric additives to improve the physical and mechanical properties of polymeric matrices.

The stabilizer compositions of the invention can be employed with a variety of polymers such as MBS, acrylate-butadiene-styrene, acrylonitrile-butadiene-styrene, styrene-butadiene-styrene block copolymers, styrene-isoprene-styrene block copolymers, and AIMS polymers to provide polymeric additives which show surprising improvement in thermal degradation and oxidation resistance.

The polymeric additives are formed by treating a polymer with a ternary stabilizer composition of an organic phosphite, a sterically hindered phenol of the structural formula, I:

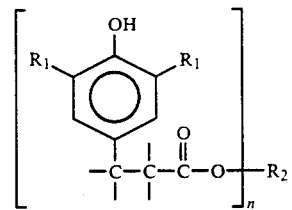

and a less sterically hindered phenol of the structural formula, II:

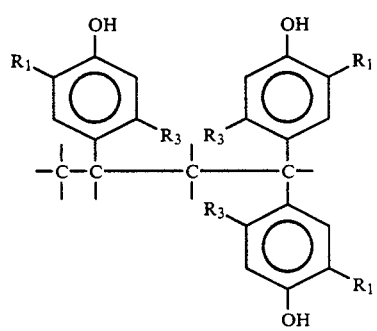

where in the above formulas $R_1$ is a branched chain alkyl, n is 1, 2, 3, or 4, $R_2$ is a carrier group of at least four carbon atoms, and $R_3$ is hydrogen or lower alkyl.

For simplicity in Structures I and II, hydrogen atoms completing the four-valence carbon atom structures are not shown.

The stabilizers of the invention can be incorporated into the polymers to provide polymeric additives by initially forming a mixture of a sterically hindered phenol with an organic phosphite. This mixture is combined with the polymer to provide a partially stabilized polymer which is then treated with a less sterically hindered phenol. Alternatively, the components of the stabilizer may be added as a ternary composition of the sterically hindered phenol, the less sterically hindered phenol, and the organic phosphite to the polymeric material to provide the polymeric additive.

The polymeric additives that include the stabilizers of the invention can be employed in polymer matrices to provide polymeric products which have improved physical and mechanical properties. The polymeric products may be produced by admixing the additive into a polymer matrix, and then molding the polymer matrix to provide an improved polymeric product.

DETAILED DESCRIPTION OF THE INVENTION

The stabilizers of the invention comprise a ternary system of two hindered phenols and an organic phosphite. The stabilizers include a sterically hindered phenol, a less sterically hindered phenol, and an organic phosphite. The sterically hindered phenol comprises from about 8 to about 82 weight % of the stabilizer, the less sterically hindered phenol comprises from about 5 to about 74 weight % of the stabilizer, and the organic phosphite comprises from about 5 to about 80 weight % of the stabilizer.

The sterically hindered phenols of this invention have the following structural formula:

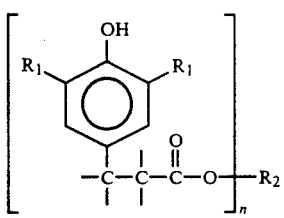

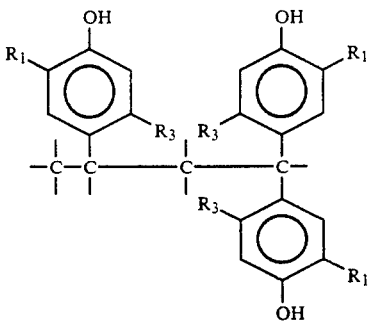

where $R_1$ is a branched chain alkyl, especially a branched chain lower alkyl of 4 to 12 carbon atoms such as tert-butyl; 2,2 dimethylpropyl; 1 methylpropyl; sec-propyl; 1,2,2 tri-methylpropyl; 2 methylpropyl, or 1,2 dimethyl-2-ethylbutyl and the like; n is 1, 2, 3, or 4; and $R_2$ is a carrier group which carries one or more of the n propionate ester groups bearing the sterically hindered phenol. The carrier group, $R_2$, is not believed to play a direct role in the antioxidant effectiveness of Structure I, but simply provides means for making available a variety of molecules which carry one or more sterically hindered phenol groups per molecule. The invention resides in the particular combination of known antioxidant structures, here the particular phenols (with phospite), and not in the associated means of carrying the phenols into use. The carrier group, $R_2$, need only confer sufficient molecular weight to Structure I so that the thermal treatments of use, described below, do not lead to inordinate loss of the sterically hindered phenol component. Molecular weight greater than about 400 daltons is found effective in most uses. Thus, in the use of a mono functional structure I (n=1), $R_2$ is an alkyl group of at least four carbon atoms, for example, $C_4$–$C_{30}$ alkyl such as butyl, pentyl, hexyl, heptyl, octyl, nonyl, decyl, dodecyl, octadecyl, eicosyl, triacontyl and the like. Alkyl groups containing at least 8 carbon atoms are preferred when n=1. In the use of a multiple functional structure I (n=2, 3, 4), $R_2$ is a $C_4$ to $C_8$ alkylene group. Examples of mono-, bis-, and tetrafunctional, sterically hindered phenols described by Structure I and known and used in the art include the following respective compositions: (where $R_2$ is octadecyl): octadecyl 3-(3',5'-di-tert-butyl -4'-hydroxy phenyl) propionate; (where $R_2$ is hexamethylene): hexamethylene bis (3,5-di-tertiarybutyl-4-hydroxy hydrocinnamate); and (where $R_2$ is tetramethylene methane): tetrakis [methylene (3,5-ditertiarybutyl-4-hydroxy hydrocinnamate] methane. Such phenols may be manufactured by methods known in the art such as, for example, by acid- or metal-catalyzed alkylation, or thermal alkylation, of the respective phenols, as is shown in *Encyclopedia of Chemical Technology*, Kirk-Othmer, 3rd Ed. Other single or multiple sterically hindered phenols of structure I are envisioned, as prepared in the art by known condensation methods, as for example, by condensation of propionic acid bearing the sterically hindered phenol with octadecanol, 1,6-hexamethylene glycol, or pentaerythritol, in the respective examples above.

The less sterically hindered phenols of this invention have the following structural formula:

where $R_1$ is as defined above and $R_3$ is hydrogen or lower alkyl such as methyl, ethyl and the like. These phenols are exemplified by a composition such as 1,1,3-tris(2'-methyl-5'-tertbutyl-4'-hydroxyphenyl) butane. Such phenols may be manufactured by, for example the acid-or metal-catalyzed alkylation, or thermal alkylation, of the respective phenols, as is shown in *Encyclopedia of Chemical Technology*, Kirk-Othmer, 3rd Ed. Again, for simplicity, hydrogen atoms fulfilling the four-valence carbon atom structures of I and II are not shown.

The organic phosphites of this invention include aliphatic and aromatic phosphites, such as tris (mono-nonylphenyl) phosphite, bisnonylphenyl pentaerythritol diphosphite, bisoctadecanyl pentaerythritol diphosphite, bistridecanyl pentaerythritol diphosphite, bis(2,4-di-tert-butylphenyl) pentaerythritol diphosphite, bis(2,6-di-tert-butyl-4-methylphenyl) pentaerythritol diphosphite, isopropylidene-bis-(phenyl-di-tridecyl) diphosphite, butylidene-bis(3-methyl-6-tert-butylphenyl-ditridecyl) phosphite, tris(2,4-di-tert-butylphenyl) phosphite, tris(mixed mono- or di-nonylphenyl) phosphite, phenyldidecanyl phosphite, tris-decanyl phosphite, tris-phenyl phosphite and the like. These organic phosphites may be manufactured by, for example, the alkoxylation and aryloxylation of $PCl_3$ in the presence of a base by the respective alcohols and phenols, as is known in the art.

A surfactant may be included with the stabilizer to provide an emulsion of the stabilizer. Examples of surfactants suitable for use with the stabilizers of the invention are those which are thermally stable over 200° C.-350° C. Most preferably, sodium dodecylbenzene sulfonate is employed as the surfactant. The amount of surfactant typically constitutes 15 to 25% (by weight) of the stabilizer emulsion depending on the specific properties of the surfactant.

The term "polymeric additive," or "polymer additive," as used herein, means a polymeric composition that is useful as an additive to other polymeric compositions.

A variety of polymers may be treated with the stabilizers of the invention to provide polymeric additives. For example, polymers such as acrylonitrile-butadiene-styrene, styrene-butadiene-styrene block copolymers, styrene-isoprene-styrene, and the like may be treated with the stabilizers of this invention to provide polymeric additives. In particular, MBS and AIMS polymers may be treated with the stabilizers of the invention to provide polymeric additives. These MBS and AIMS polymeric additives have been found to impart surprisingly improved physical and mechanical properties to polymer matrices such as polycarbonate.

The types of MBS and AIMS polymers which are useful as polymeric additives in polymeric matrices such as polycarbonates are of the core/shell type. Core/shell type MBS polymers have a rubbery core of polymer that contains at least 50 weight percent butadiene, a second stage shell of either styrenic polymers, styrene/methacrylate polymers, or alkyl methacrylate polymers, and an optional third stage shell of either styrenic polymers, styrene/methacrylate polymers, or alkyl methacrylate polymers, with the proviso that the compositions of the second and third shells are not identical. The second and third stage shells also may be cross-linked. AIMS polymers are prepared as multiple stage polymers, such as for example of the core/shell type, and have a rubbery core of polymer that contains at least 50 weight % of an alkyl acrylate or methacrylate polymer or copolymer and one or more outer stages, shells, or layers, of (meth)acrylic and other vinylic monomer polymers or copolymers. The core and outer shells may be crosslinked and graftlinked. Preferred AIMS polymers are described, for example, in U.S. Pat. Nos. 3,678,133, 3,808,180, and 4,096,202 having a rubber core of alkyl acrylate, one or more shells of either stryrenic polymers, styrene-methacrylate copolymers, or alkyl methacrylate polymers, and in U.S. Pat. No. 3,793,402 having a non-elastomeric, hard first stage of alkyl methacrylate and one or more shells of either styrenic polymers, styrene-(meth)acrylate copolymers, or alkyl (meth)acrylate polymers and copolymers.

The polymeric additives of the invention may be prepared by various methods such as by forming a first mixture of a sterically hindered phenol of formula I above, and an organic phosphite, and adding that first mixture to a polymer to provide a partially stabilized polymeric additive. The partially stabilized additive can be admixed with a less sterically hindered phenol of formula II above to provide the polymeric additive. Alternatively, the polymeric additives can be prepared by admixing a polymer emulsion with a mixture of the three components of the stabilizer. As a further alternative, the polymeric additives can be prepared by dry blending the stabilizer with the polymer.

In a preferred method for manufacture of MBS and AIMS polymer additives, octadecyl 3-(3',5'-di-tert-butyl-4'-hydroxyphenyl) propionate, for example, and tris (mono-nonylphenyl) phosphite are mixed to form a first stabilizer component that is admixed with a core/shell type MBS or AIMS polymer to form a partially stabilized MBS or AIMS polymer. The partially stabilized MBS or AIMS polymer is then admixed with 1,1,3-tris(2'-methyl-5'-tert-butyl -4'-hydroxyphenyl) butane to provide an MBS or AIMS polymer additive which can be admixed with polycarbonate to provide polycarbonate products with surprisingly improved oxidation resistance and impact strength. The total amount of octadecyl 3-(3',5'-di-tert-butyl-4'-hydroxyphenyl) propionate, tris (mono-nonylphenyl) phosphite and 1,1,3-tris(2'-methyl-5'-tert-butyl-4'-hydroxyphenyl) butane can vary from about 0.9 to about 6.6 percent by weight of the MBS or AIMS polymer. Octadecyl 3-(3',5'di-tert-butyl-4'-hydroxyphenyl) propionate can be about 0.4-2.3 weight %, tris (mono-nonylphenyl) phosphite can be about 0.25-2.5 weight %, and 1,1,3-tris(2'-methyl-5'-tert-butyl-4'-hydroxyphenyl) butane can be about 0.25-1.8 weight %, the percentages based on weight of the MBS or AIMS polymer as 100%.

The polymeric additives that are produced by treatment with the stabilizers of the invention can be readily employed in a wide variety of polymer matrices to provide polymer products which have improved physical and mechanical properties. The polymeric additives can be included in polymer matrices such as polymers of acrylates, methacrylates, mixtures of acrylates with methacrylates, styrene with acrylates, styrenes with methacrylates, styrene derivatives with acrylates, styrene derivatives with methacrylates, maleates, fumarates, olefin copolymers with acrylates, olefin copolymers with methacrylates, maleic anhydrides followed by functionalization of the anhydride, and engineering resins including aromatic polyesters such as poly(ethylene terephthalate), poly(butylene terephthalate) and the like, nylon polymers such as poly(hexamethylene adipamide) and related polyamides, poly(p-phenylene sulfides), polysulfones, polyarylates, polystyrene, poly(ether imides), polyimides, poly(glutarimides), poly(phenylene ethers), and polycarbonates of the formula —R—O—C(O)—O— where R is aliphatic, aromatic or heterocyclic, especially of the bisphenol A type, as well as various combinations and blends of these. Generally, the additive is blended with the polymeric matrix, such as an engineering resin, which is then molded to form a polymer product that has improved physical and mechanical properties. The improved polymer products may be used, for example, int the manufacture of articles such as automotive bumpers and spoilers, in extruded pipes and profiles, in automotive under-the-hood applications such as pump and motor housings. Other uses for these polymeric products include heat resistant and solvent resistant engineering resins applications, medical devices, electrical insulators, and packaging materials. Other uses and articles will be obvious to those skilled in the art.

It is believed that one skilled in the art can, using the preceding description, utilize the present invention to its fullest extent. The following preferred specific embodiments are, therefore, to be construed as merely illustrative, and not limitative of the disclosure in any way. In the following examples, all temperatures are set forth in degrees Celsius and all parts and percentages are by weight, unless otherwise indicated.

STEP 1. PREPARATION OF MBS AND AIMS POLYMERS

Step 1A. Preparation of MBS Rubbery Polymer Latex

A stainless steel autoclave with an agitator and several entry ports is charges with a mixture of 5 parts of diphenyl oxide sulfonate emulsifier in 2688 parts of de-ionized water and 4.9 parts of sodium formaldehyde sulfoxylate. This mixture is brought to pH 4. The autoclave is then evacuated and 2297 parts of butadiene, 96.8 parts of styrene, 12 parts of cumene hydroperoxide, and 24.5 parts of divinylbenzene are added and caused to react at 70° C. during a period of 9 hours. An additional 36.9 parts of emulsifier is then added. At the end of the reaction period no further pressure drop is observed, the residual pressure is vented and the latex strained to remove gum.

Step 1B. Preparation of the MBS Polymer

To 500 parts of the latex prepared in Step A are added 34 parts of styrene, followed by 0.068 parts of sodium formaldehyde sulfoxylate dissolved in 52 parts of deionized water, and 0.136 parts of cumene hydroperoxide. One hour after completion of the exotherm, 35 parts of methyl methacrylate, 0.352 parts of butylene dimethacrylate, 0.035 parts sodium formaldehyde sulfoxylate dissolved in 10 parts deionized water and 0.070 parts of cumene hydroperoxide are added and caused to react to completion. The resultant polymer latex has a butadiene/styrene rubber content of 77.5% by weight, with an overall butadiene content of 73.6%.

Step 1C. Preparation of the AIMS Polymer

Following the method disclosed in U.S. Pat. No. 3,678,133, Example 5, a core/shell polymer is prepared in emulsion of the following composition: butyl acrylate/trimethylolpropane triacrylate/diallyl maleate//methyl methacrylate in the weight ratios of 79/0.5/0.5//20.

Thus, to a suitable reaction vessel there is added a charge of 86 parts of deionized water, 10 parts of a 10 percent by weight aqueous solution of sodium lauryl sulfate, and 0.1 part glacial acetic acid. While the mixture is continuously stirred, 100 parts of the elastomer phase monomer charge (98.5 wt. % butyl acrylate/0.75 wt % trimethylolpropane triacrylate/0.75 wt. % diallyl maleate) is added and the reaction vessel is purged with nitrogen for 30 minutes. Then 0.17 parts of cumene hydroperoxide is added and the mixture is heated to 40 deg. C. There is then added at 3 minute intervals small increments of a dilute aqueous solution of sodium formaldehyde sulfoxylate until polymerization is initiated, as indicated by an exotherm. Ordinarily, about 0.001 to about 0.005 parts of the sulfoxylate is sufficient. The reaction is continued for at least one hour, or to substantial depletion of the monomers. The temperature of the system is then adjusted to 40 deg. C. and additional sodium formaldehyde sulfoxylate (about 0.05 parts) is added. Onto the elastomeric phase there is polymerized 25 parts by weight, per 100 parts by weight of the elastomer stage, of the rigid phase monomer, methyl methacrylate. The methyl methacrylate and 0.15 parts of cumene hydroperoxide are added in bulk. The reaction is allowed to exotherm over a period of about 1 hour to peak temperature and this temperature is maintained for an additional 30 minutes. The reaction mixture is then cooled to about ambient temperaure.

STEP. 2. PREPARATION OF MBS OR AIMS POLYMER ADDITIVE

Step 2. Preparation of First Stabilizer Component

A first stabilizer component of a mixture of ninety grams of octadecyl 3-(3',5'-di-tertbutyl-4'-hydroxyphenyl) propionate (hereinafter designated "Antioxidant A") and sixty grams of tris mono-nonylphenyl) phosphite (hereinafter designated "Antioxidant B") are charged to a reaction vessel while raising the temperature to 70°-80° C. When the mixture begins to melt, it is vigorously agitated to yield a homogenous melt whereupon 174 grams of a surfactant of sodium dodecylbenzene sulfonate is charged as a 20-25% active aqueous solution to provide an emulsion of the stabilizer component. The emulsion is agitated for 15 minutes and 51 grams of deionized water is added to the emulsion. After an additional 30 minutes of mixing, the emulsion of the stabilizer component is used in preparing either the MBS or AIMS polymer additive as described respectively in step 2B or 2C below.

Step 2B. Preparation of MSB Polymer Additive

Polymer additive, whether of the MBS or AIMS type, is prepared by identical procedures. Thus, to prepared to MBS polymeric additive, 1,000 grams of a 50% solids latex of the MBS polymer emulsion synthesized in Steps 1A and B, at 50-55 deg. C., is mixed with 0.5 grams of a chelating agent which is the disodium salt of ethylenediaminetetraacetic acid (EDTA-2Na) predissolved in 25 grams of deionized water, and thirty-one grams of the stabilizer component emulsion formed in Step 2A. Then, 8.6 grams of a 50% active aqueous dispersion of 1,1,3-tris-(2'-methyl-5'-tertbutyl-4'-hydroxyphenyl) butane (the 100% active component of which is hereinafter designated "Antioxidant C") is added to the MBS latex containing the stabilizer component. The resulting emulsion is agitated for 30 minutes at 50°-55° C. and then cooled to less than 40° C. The emulsion is isolated by conventional spray drying to provide a free-flowing MBS polymeric additive.

The MBS polymer additive thus contains 1.5 wt % of Antioxidant A, 1.0 wt % of Antioxidant B, and approximately 0.9 wt % of Antioxidant C, all percentages based on polymer weight. Step 2C. Preparation of AIMS Polymer Additive Polymer additive, whether of the MBS or AIMS type, is prepared by identical procedures. Thus, in preparing the AIMS polymeric additive, 1,000 grams of a 50% solids latex of the AIMS polymer emulsion synthesized in Step 1C, at 50-55 deg. C., is mixed with 0.5 grams of a chelating agent which is the disodium salt of ethylenediaminetetraacetic acid (EDTA-2Na) predissolved in 25 grams of deionized water, and thirty-one grams of the stabilizer component emulsion formed in Step 2A. Then, 8.6 grams of a 50% active aqueous dispersion of 1,1,3-tris-(2'-methyl-5'-tertbutyl-4'-hydroxyphenyl) butane, "Antioxidant C," is added to the AIMS latex containing the stabilizer component. The resulting treated emulsion is agitated for 30 minutes at 50°-55° C. and then cooled to less than 40° C. The treated emulsion is isolated by spray drying to provide a free-flowing AIMS polymeric additive.

The AIMS polymer additive thus contains 1.5 wt % of Antioxidant A, 1.0 wt % of Antioxidant B, and approximately 0.9 wt % of Antioxidant C, all percentages based on polymer weight.

PREPARATION OF IMPROVED POLYMERIC PRODUCTS

Either of the MBS or AIMS polymeric additive from respectively Step 2B or 2C is incorporated into polycarbonate to provide products with surprisingly improved oxidation resistance and impact strength. The polymer additive is incorporated into a polymer matrix of polycarbonate by melt blending the additive with the polycarbonate and then forming the resulting polymer product into molded products. The MBS or AIMS polymeric additive can be employed in amounts of 2 to 40 weight % of the polymer matrix. Preferably, 5-15 wt % of the MBS polymeric additive, or 5-20 wt % of the AIMS polymeric additive, is included with the polymer matrix in preparing the polymer product.

Examples which incorporate MBS polymeric additives into polycarbonate products (Examples 1-3) and an AIMS polymeric additive into a polycarbonate product (Example 6) are described more fully below. Examples of AIMS polymeric additives prepared for independent testing prior to blending with polycarbonate are described as Examples 4 and 5.

In MBS examples 1-3, molded products of polycarbonate that incorporate the MBS polymeric additives of the invention are prepared by dry mixing 8 weight percent of the MBS additive with polycarbonate having a weight average (Mw) molecular weight of 49,000 and a number average (Mn) molecular weight of 26,000. This mixture is melt blended at 260° C. at 60 rpm in a single screw, 2.54 cm. Killion extruder to provide pellets that are injection molded in a 275 Kg. Newbury Injection Molder at either 285°, 332°, or 357° C. The injection molding conditions include a cycle time of 30 seconds, an injection time of 10 seconds, an injection pressure of 4.2 mega-pascal, and a back pressure of 0.34 mega-pascal. Example 1 employs an MBS additive that includes 1.5% by weight of Antioxidant A, 1.0% by weight of Antioxidant B, and 1.0% by weight of Antioxidant C (weight % based on weight of MBS polymer). Antioxidant A therefore constitutes 42% of the stabilizer compound employed with the MBS polymer. Similarly, Antioxidants B and C each constitute 29% of the stabilizer compound employed with the MBS polymer. Example 2 employs an MBS additive that includes 1.5% Antioxidant A, 2.0% Antioxidant B, and 1.0% Antioxidant C (weight % based on weight of MBS polymer). Example 3 employs an MBS additive that includes 1.5% Antioxidant A, 1.0% Antioxidant B, and 0.5% Antioxidant C (weight % based on weight of MBS polymer).

The polycarbonate products that incorporate the MBS or AIMS polymer additives of the invention have surprisingly improved physical and mechanical properties. In particular, polycarbonate products that incorporate the MBS or AIMS polymer additives of the invention have significantly improved oxidation resistance as well as improved impact strength. The surprising improvement in impact strength that is attributable to including the MBS polymeric additives of the invention in polycarbonate matrices is shown in Table I.

Table I provides impact strength data for Examples 1-3 as well as for Comparative Examples 1 and 2. Comparative Example 1 employs a polymeric additive based on a commercially available MBS polymer that contains 0.6-1.0% triethylene glycol bis(3-(3'-tert-butyl-4'-hydroxy-5'-methylphenyl)propionate), and 0.6-1.0% dilaurylthio dipropionate. Comparative Example 2 employs an MBS additive formed by the experimental procedures outlined in Step 2B and in which 1.35 wt. % of 2,6-ditertiarybutyl cresol is the only stabilizer added to the MBS polymer of Step 1B.

TABLE 1

| Sample | Impact Strength (Notes 1,2) Injection Molding Temperature | |
|---|---|---|
|  | 332° C. | 357° C. |
| Ex. 1 | 690$^d$ | 590$^d$ |
| Ex. 2 | 690$^d$ | 690$^d$ |
| Ex. 3 | 690$^d$ | 640$^d$ |
| Comparative. Ex. 1 | 640$^d$ | 265$^b$ |
| Comparative. Ex. 2 | 290$^b$ | 69$^b$ |

Notes:
1. Impact Strength in Joules/meter
2. Notched Izod Impact tests conducted on notched 6.4 mm width Izod bars at 23° C. in accordance with ASTM Method D 256;
$^d$indicates ductile fracture
$^b$indicates brittle fracture Table II provides impact strength and Yellowness Index values for the aforedescribed Examples 1-3. As shown in Table II, the polycarbonate compositions of Examples 1-3 that are injection molded at 285° C. and subject to 10 days of oven aging in air at 120° C. retain a surprisingly high 85% of their original impact strength as well their ductile mode of fracture. By comparison, the polycarbonate product of the aforedescribed Comparative Example 1 retains less than 43% of its original impact strength and exhibits undesirable brittle fracture. In addition to surprisingly improved mechanical properties, the polycarbonate products which employ the MBS additives of the invention exhibit surprisingly improved oxidation resistance (as measured by lowered Yellowness Index). As shown in Table II, the aforedescribed Comparative Example 1 has a yellowness index of more than three times that of Example 1.

TABLE II

| Sample | Impact Strength$^{1,2}$ | | Yellowness Index$^3$ |
|---|---|---|---|
|  | As Molded$^4$ | Oven Aged$^5$ |  |
| Ex. 1 | 800$^d$ | 690$^d$ | 40 |
| Ex. 2 | 750$^d$ | 690$^d$ | 59 |
| Ex. 3 | 750$^d$ | 690$^d$ | 44 |
| Comparative. Ex. 1 | 750$^d$ | 320$^b$ | 131 |

Notes:
[1]Notched Izod on 3.2 mm. width bars at 23° C. in accordance with ASTM Method D 256.
[2]Impact strength in Joules per meter
$^d$indicates ductile fracture
$^b$indicates brittle fracture
[3]Yellowness Index by reflectance, ASTM Method D 1925, measured on samples which were oven aged samples in air at 120° C. for ten days. All samples before oven aging showed Yellowness Index values of less than 12.
[4]Impact strength measured on samples injection molded at 285° C.
[5]Impact strength measured on injection molded samples that were oven aged in air at 230° C. for 10 days.

AIMS polymeric additive examples 4 and 5, and comparative AIMS polymer samples, are prepared for independent testing of their relative thermal stability. Specifically, the AIMS polymeric additive of Example 4 is prepared by the procedure described in Step 2C, using stabilizers in the amounts to yield the following ratios: 0.9% by weight Antioxidant A, 0.6% Antioxidant B, and 0.55% Antioxidant C, and are incorporated into the AIMS polymer of Step 1C; weight percents of stabilizers in the AIMS polymeric additive are based on the AIMS polymer as 100%. The AIMS polymeric additive of Example 5 contains twice the level of each additive of Example 4; thus Example 5 contains 1.8% Antioxidant A, 1.2% of B, and 1.1% of C, all weight percents based on the AIMS polymer as 100%.

Thermal stability of the AIMS polymeric additives (Exs 4 and 5) are tested versus Comparative Example 3. Comparative Example 3 is the same AIMS polymer used in preparing the AIMS polymer additives of Examples 4 and 5, but without the stabilizer. Tests are made in which the time to exotherm is measured. The time to exotherm is the time required to achieve the maximum exotherm rate as measured by differential scanning calorimetry (DSC), with a 15-20 milligram sample held at 280 deg. C. in air. In the DSC test, the relative thermal stability is clearly demonstrated by the length of time to exotherm (exotherm providing an excellent indication of rapid degradation.)

A second test is conducted in which the temperature is observed at which a 10% sample weight loss occurs in air under standard or fixed rates of sample heating from 50 to 500 degrees C. This test is a standard thermogravimetric analysis (TGA) test.

Results of the termal tests just described are shown in Table III.

TABLE III

| | Thermal Stability of AIMS Polymer Additives | |
|---|---|---|
| Sample | DSC Exotherm Time @280 deg C. Minutes | TGA Temperature for 10% Wt. Loss |
| Comp. Ex. 3 | <1 | 242 deg. C. |
| Ex. 4 | 21 | 290 deg. C. |
| Ex. 5 | 95 | 305 deg. C. |

In Example 6, molded products of polycarbonate that incorporate the AIMS polymeric additives of the invention are prepared by dry mixing 10 weight percent of the AIMS polymeric additive of Example 5 with the same polycarbonate used in Exs. 1–3. The mixture is melt blended and injection molded under conditions described for the MBS products of Examples 1–3.

Table IV lists the Yellowness Index (YI) response of the product of Example 6 and that of the product of Comparative Example 4. Comparative Example 4 is a molded product of polycarbonate incorporating the same AIMS polymer absent the stabilizer in Ex. 6. The Yellowness index by reflectance is measured by ASTM Method D 1925 on samples immediately after compounding (Initial YI) and after oven aging in air at 120 deg. C. for 10 days.

TABLE IV

| | Yellowness Index of AIMS Molded Product | |
|---|---|---|
| Sample | Initial YI | YI after 10 Days at 120 deg. C. |
| Comp. Ex. 4 | 3.5 | 8.2 |
| Example 6 | 1.9 | 2.9 |

Analogous to polycarbonate matrices, the MBS or AIMS polymer additives of the invention can be incorporated into other polymer matrices such as those polymers of acrylates, methacrylates, mixtures of acrylates with methacrylates, styrene with acrylates, styrenes with methacrylates, styrene derivatives with acrylates, styrene derivatives with methacrylates, maleates, fumarates, olefin copolymers with acrylates, olefin copolymers with methacrylates, maleic anhydrides followed by functionalization of the anhydride. Other polymer matrices include engineering resins such as aromatic polyesters such as poly(ethylene terephthalate), poly(butylene terephthalate) and the like, nylon polymers such as poly(hexamethylene adipamide) and related polyamides, poly(p-phenylene sulfides), polysulfones, polyarylates, polystyrene, poly(ether imides), polyimides, poly(glutarimides), poly(phenylene ethers), as well as various combinations and blends of these.

The polymer products which incorporate the polymer additives of the invention may be formed, as for example, by injection molding or extruding, into a variey of useful objects and articles such as automotive parts, computer housings, appliance housings, tough films, and the like. These polymer products are also useful for producing blow-molded articles such as bottles, fuel tanks, automotive bumpers, and the like. Other uses for these polymeric products include heat resistant and solvent resistant engineering thermoplastics, medical devices, electrical insulators and food packaging. The polymer products may be formed into sheet, film, rod, profile, or complex parts by any known plastics processing technique, and can be painted, dyed, decorated, metallized, or coated with abrasion resistant coatings.

While the invention has been described and exemplified in great detail, alternative embodiments, alterations and improvements should become apparent without departure from the spirit and scope of the invention.

What is claimed is:

1. A composition consisting essentially of:
   a) from about 8 to about 82 weight % of a sterically hindered phenol of the structural formula:

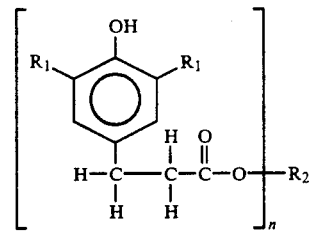

from about 5 to about 74 weight % of a less sterically hindered phenol of the structural formula:

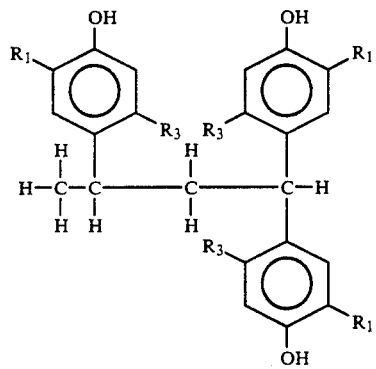

and
c) from about 5 to about 80 weight % of an organic phosphite selected from tris (mono-nonylphenyl) phosphite, bisnonylphenyl pentaerythritol diphosphite, bisoctadecanyl pentaerythritol diphosphite, bistridecanyl pentaerythritol diphosphite, bis(2,4-di-tert-butylphenyl) pentaerythritol diphosphite, bis(2,6-di-tert-butyl-4-methylphenyl) pentaerythritol diphosphite, isopropylidene-bis-(phenyl-di-tridecyl) phosphite, butylidene-bis(3-methyl-6-tert-butylphenyl-ditridecyl) phosphite, tris (2,4-di-tert-butylphenyl) phosphite, tris(mixed mono- or dinonylphenyl) phosphite, phenyl-didecanyl phosphite, tris-decanyl phosphite, or tris-phenyl phosphite; where $R_1$ is branched chain alkyl, n is 1, 2, or 4, $R_2$ is an alkyl group of at least 4 carbon atoms when n is 1 and a $C_4$–$C_8$ alkylene group when n is 2 or 4, and $R_3$ is hydrogen or lower alkyl.

2. The composition of claim 1 wherein $R^1$ is tert-butyl; 2,2-dimethypropyl; 1-methylpropyl; sec-propyl; 1,2,2,-trimethylpropyl; 2-methylpropyl or 1,2-dimethyl-2-ethylbutyl; and $R^3$ is hydrogen or methyl.

3. The composition of claim 1 wherein n is 1 and the group, $R_2$, is a $C_4$–$C_{30}$ alkyl group.

4. The composition of claim 3 wherein the alkyl group is octadecyl.

5. The composition of claim 1 wherein n is 2 and the group, $R_2$, is a $C_4$–$C_8$ alkylene group.

6. The composition of claim 1 wherein n is 4 and the group, $R_2$, is tetramethylene methane.

7. The composition of claim 1 wherein the sterically hindered phenol comprises octadecyl 3-(3',5'-di-tert-butyl-4'- hydroxyphenyl) propionate, hexamethylene bis (3,5-di-tertiarybutyl-4-hydroxy hydrocinnamate), or tetrakis methane; and the organic phosphite is tris (mono-nonylphenyl) phosphite.

8. The composition of claim 7 comprising from about 8 to about 82% of the sterically hindered phenol, from about 5 to about 74% of 1,1,3-tris(2'-methyl-5'-tertbutyl-4'-hydroxyphenyl)butane, and from about 5 to about 80% of tris (mono-nonylphenyl) phosphite.

9. The composition of claim 8 comprising about 42% of octadecyl 3-(3',5'-di-tert-butyl-4'-hydroxyphenyl) propionate, about 29% of 1,1,3-tris(2'-methyl-5'-tert-butyl-4'-hydroxyphenyl)butane and about 29% of tris (mono-nonylphenyl) phosphite.

10. A polymer additive, comprising a polymer and the composition of claim 1.

11. The polymer additive of claim 10 wherein the polymer is MBS polymer.

12. The polymer additive of claim 10 wherein the polymer is AIMS polymer.

13. The polymer additive of claims 11 or 12 wherein the sterically hindered phenol is from about 8 to about 82% of the composition, the less sterically hindered phenol is from about 5 to about 74% of the composition, and the organic phosphite is from about 5 to about 80% of the composition.

14. The polymer additive of claim 13 wherein the composition is from about 0.9 to about 6.6 weight % of the polymer.

15. A polymer product, comprising a polymer matrix and the polymer additive of claim 10.

16. The polymer product of claim 15 wherein the polymer matrix is an engineering resin.

17. The polymer product of claim 16 wherein the engineering resin is polycarbonate.

18. An article prepared from the polymer product of claim 15.

19. An article prepared from the engineering resin of claim 16.

20. An article prepared from the polycarbonate of claim 17.

* * * * *